United States Patent

Deker

[11] Patent Number: 6,097,996
[45] Date of Patent: Aug. 1, 2000

[54] METHOD FOR THE LATERAL AVOIDANCE OF A MOBILE ZONE BY A VEHICLE

[75] Inventor: Guy Deker, Chaville, France

[73] Assignee: Sextant Avionique, Velizy Villacoublay, France

[21] Appl. No.: 09/147,357

[22] PCT Filed: Jun. 3, 1997

[86] PCT No.: PCT/FR97/00969

§ 371 Date: Dec. 7, 1998

§ 102(e) Date: Dec. 7, 1998

[87] PCT Pub. No.: WO97/47945

PCT Pub. Date: Dec. 18, 1997

[30] Foreign Application Priority Data

Jun. 7, 1996 [FR] France .................................. 96 07075

[51] Int. Cl.[7] .................................................. G01C 21/00
[52] U.S. Cl. .................................. 701/10; 701/3; 701/301
[58] Field of Search .................................. 701/3, 10, 301, 701/302; 342/46, 33, 350

[56] References Cited

U.S. PATENT DOCUMENTS

| 3,781,530 | 12/1973 | Britland et al. | 701/301 |
| 4,812,990 | 3/1989 | Adams et al. | 701/3 |
| 5,526,260 | 6/1996 | Kodet et al. | 702/2 |
| 5,631,640 | 5/1997 | Deis et al. | 340/961 |

*Primary Examiner*—Michael J. Zanelli
*Assistant Examiner*—Eric M Gibson
*Attorney, Agent, or Firm*—Oblon, Spivak, McClelland, Maier & Neustadt, P.C.

[57] ABSTRACT

A method for avoiding a mobile zone by a vehicle. A vehicle laterally avoids a mobile zone using periodically supplied information relating to the zone to be avoided starting from an initially planned route. The envelope of the zone to be avoided is periodically defined and a circumscribed circle about the envelope is determined. The velocity vector of the circle is also determined as is the portion of the route lying over the path of the circle. If the vehicle has to enter the circle, the computation of port and starboard trajectories for the avoidance of the zone is delimited by the circle. The selection of one of these two avoidance trajectories as a function of the length of the new avoidance routes is computed in the direction of the zone to be avoided.

20 Claims, 3 Drawing Sheets

METHOD FOR THE LATERAL AVOIDANCE OF A MOBILE ZONE BY A VEHICLE

BACKGROUND OF THE INVENTION

1. Field of the Invention

The present invention relates to a method for determining a trajectory for the lateral avoidance by a vehicle of a mobile zone which it is undesirable to traverse.

2. Discussion of the Background

It applies in particular, but not exclusively, to the piloting of an aerodyne, to aid the pilot rapidly to determine in flight, an avoidance trajectory, for example to avoid a dangerous meteorological zone, such as a storm formation.

Indeed, the most characteristic meteorological phenomenon to be avoided absolutely by an aerodyne is the storm formation prevailing within a cumulo-nimbus in which there are severe conditions of turbulence and icing, and in which the risk of lightning strikes is considerable.

To avoid this phenomenon, most aerodynes equipped with instruments for nil-visibility piloting make use of a weather radar which supplies meteorological information, this information giving in particular the contours of the meteorological zones associated with a danger level. However, having been detected, it is up to the pilot to handle the meteorological problem manually either by carrying out avoidance in sight of the zone, or by traversing the zone.

SUMMARY OF THE INVENTION

The objective of the present invention is to relieve the pilot of a vehicle in the case in which an unexpected phenomenon has to be avoided by laterally bypassing the zone where the phenomenon is occurring. For this purpose, it proposes a method for the lateral avoidance by a vehicle of at least one mobile zone starting from an initially planned route and from periodically supplied information giving the contours of the mobile zone to be avoided and the current position and the speed of the vehicle.

According to the invention, this method is characterized in that it comprises the following steps in succession:

- the periodic definition of the envelope of the zone to be avoided with the aid of the said contour information,
- the determination of a circumscribed circle about the envelope of the zone to be avoided, and of the velocity vector of the circumscribed circle by recording successive positions of the latter,
- the determination of the portion of the planned route situated over the path of the circumscribed circle, and the positioning of the circumscribed circle at the moment at which the vehicle lies on the said portion of route,
- if having been positioned, the circumscribed circle is traversed by the planned route of the vehicle, the computation of port and starboard trajectories for the avoidance of the zone delimited by the circumscribed circle, which connect points of exit and of return to the initially planned route, and
- the selection of one of these two avoidance trajectories as a function of the length of the new routes respectively including the computed avoidance trajectories, and of the velocity vector of the centre of the circumscribed circle about the zone to be avoided.

By virtue of these provisions, the avoidance of a mobile zone can be fully automated.

According to a feature of the invention, the points of exit and of return to the initially planned route correspond to the points of intersection with the latter of tangents to the circumscribed circle about the envelope of the zone to be avoided, forming a predetermined angle with the initially planned route, the port and starboard avoidance trajectories being defined by these tangents.

Advantageously, the method according to the invention applies also to the case of multiple mobile zones. In this case, the method furthermore comprises:

- the determination of a circumscribed circle about the envelope of each zone to be avoided, and of the respective velocity vector of the circumscribed circles thus determined, by recording successive positions of these latter,
- the positioning of each zone with respect to the planned route of the vehicle at the respective moments at which the vehicle is situated on the portions of route which are traversed by the said zones,
- the determination of the first zone lying on the planned route and a first selection of the zones to be avoided lying in a sector delimited by the tangents to the circumscribed circle about the first zone to be avoided and passing through the current position of the vehicle,
- a second selection from among the zones selected previously of the zones situated at a distance less than a predetermined threshold from the first zone or from a zone already selected during the second selection,
- the determination of the points of exit from the initially planned route by considering the first zone, and of the points of return to the planned route by considering the latest zone selected; and
- the computation of the port and starboard avoidance trajectories composed of tangent segments to the circumscribed circles about each previously selected zone, and tangent segments passing through the points of exit and of return to the planned route.

BRIEF DESCRIPTION OF THE DRAWINGS

An embodiment of the method according to the invention will be described below by way of non-limiting example with reference to the appended drawings in which.

DETAILED DESCRIPTION OF THE PREFERRED EMBODIMENTS

Figure 1:
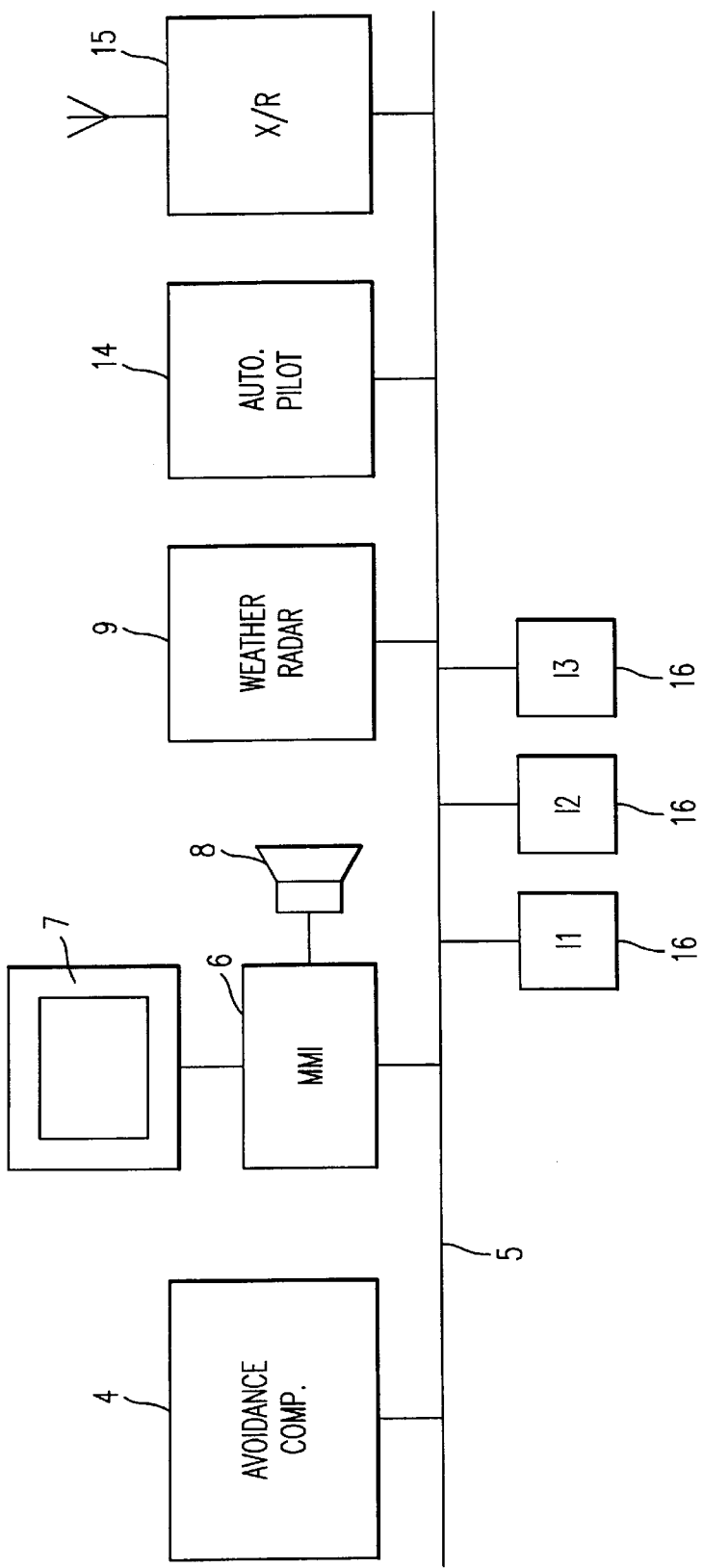
FIG. 1 diagrammatically represents the electronic equipment of an aerodyne comprising a computer intended to implement the method according to the invention.

As represented in FIG. 1, the method according to the invention is particularly designed to be executed by a computer 4 installed on board an aerodyne, which is coupled by way of a data transmission bus 5 called the "aircraft bus", to the navigation equipment which includes an automatic piloting device 14 and navigation instruments 16, to a weather radar 9 and also to a man/machine interface device 6 comprising a control element and signalling elements, such as a display screen 7 and a loudspeaker 8 which are installed in the cockpit.

In a known manner, the automatic piloting device 14 comprises a memory in which is recorded the aerodyne's planned trajectory consisting of a succession of straight segments between the departure point and the destination point.

Moreover, the weather radar 9 is designed to determine the density of objects reflecting the electromagnetic waves emitted by the radar, such as particles of water or of ice and precipitations. Such a radar periodically supplies information for reconstructing the contour of zones associated with a danger level.

Figure 2:
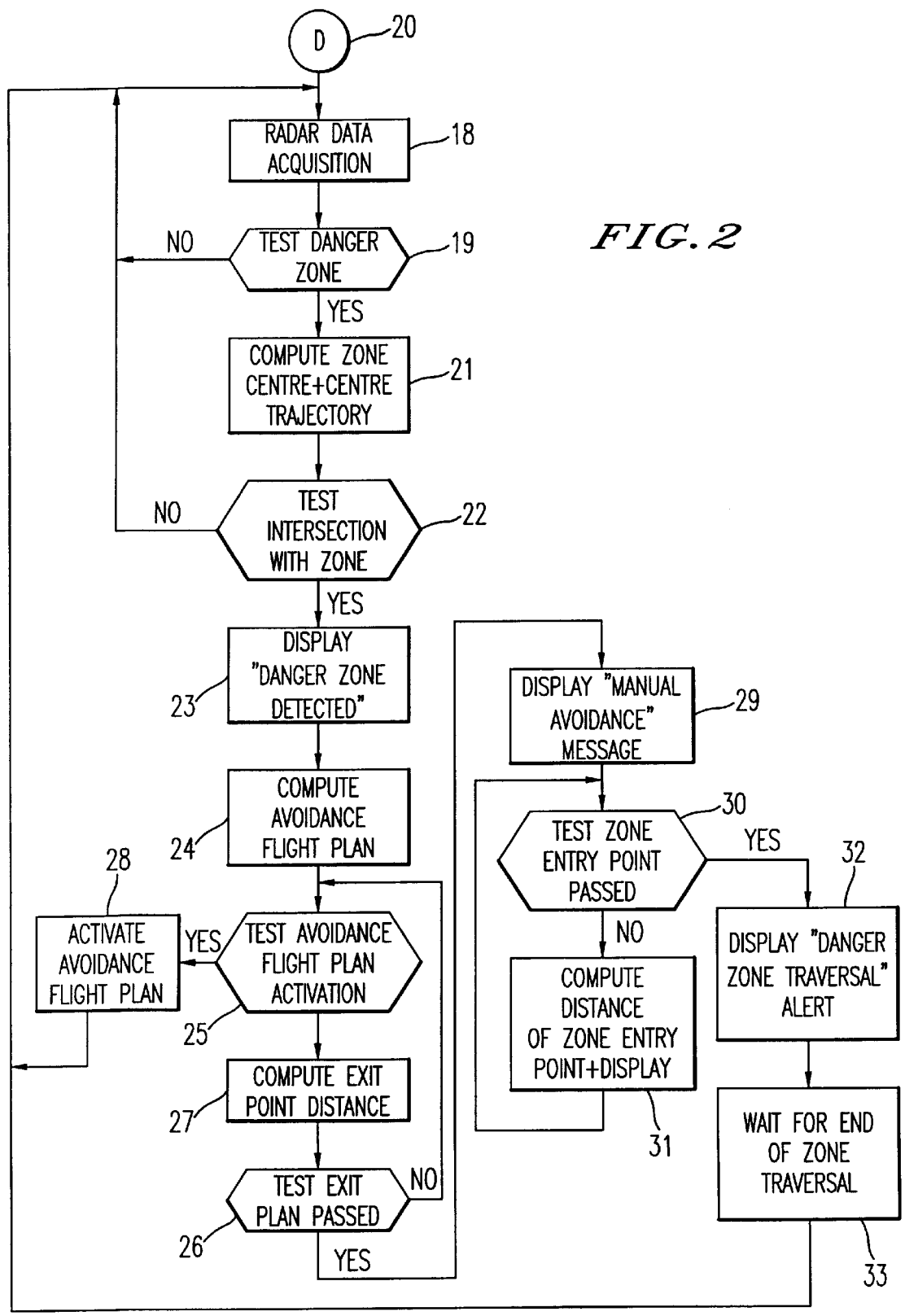
FIG. 2 diagrammatically illustrates the algorithm executed to method the signals detecting zones to be avoided.

The algorithm shown in FIG. 2 is executed by the computer 4 installed on board the aerodyne. It consists firstly in continuously acquiring the data supplied periodically by the weather radar 9 (step 18), and in testing the danger level associated with the data received (step 19). This analysis is performed mainly on the same horizontal plane as the aircraft (zero inclination), but also at slightly positive and negative angles (inclination of −5 degrees to +15 degrees), so as to specify the magnitude and dangerous nature of the phenomenon.

Figure 3:
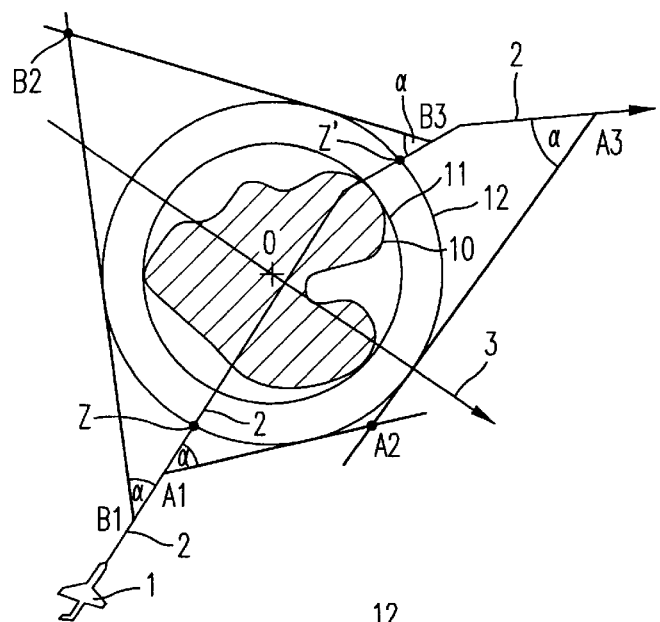
FIGS. 3 and 4 diagrammatically represent the trajectory of an aerodyne which traverses a zone to be avoided and the possible avoidance trajectories.

When a zone to be avoided, that is to say one which is associated with a danger level exceeding a certain threshold, is detected by the weather radar 9, this zone corresponding for example to a storm zone consisting of a cumulo-nimbus, the computer 4 determines from these data, each time they are supplied by the radar 9, a circle 11 within which the storm zone 10 is circumscribed (see FIG. 3). This circle is for example determined by the position of its centre O and by its radius. To a first approximation, these values can be determined by considering the points of the contour of the significant level of danger of the zone which are furthest apart. For a more accurate determination of these values with a view to optimizing the avoidance trajectory, the contour of the zone is firstly modelled by a succession of straight segments and then processed in such a way as to eliminate the points of concavity so as to model the zone by a convex polygonal shape. Next, the centre of the zone is determined by a barycentre computation, the radius of the circumscribed circle corresponding to the distance between the zone centre thus computed and the point of the contour of the zone which is furthest from the centre.

The periodic determination of this circle makes it possible to compute the velocity vector 3 representative of the movement of the zone 10.

Of course, these results can be consolidated with meteorological information supplied by other on-board instruments 16 or by terrestrial equipment transmitting this information by radio and which is received by a transceiver 15 linked to the aircraft bus 5.

Once these computations have been performed in step 21, the computer 4 will search in step 22, having regard to the velocity vector 3 considered constant in value and to the current position of the zone to be avoided 10, and to the planned route 2, to the current position and speed of the aerodyne 1, to find out whether the latter is liable to enter the zone 10 modelled by the circle 11.

If the aerodyne is not going to enter the zone 10, the analysis of the information supplied by the radar is continued by returning to the start 20 of the algorithm. In the contrary case, the computer 4 sends a message intended for the display 7 so as to warn the pilot that the route 2 to be travelled by the aerodyne 1 traverses a danger zone which it would be preferable to avoid (step 23). Next it triggers the computation of an avoidance trajectory (step 24) which consists firstly, as represented in FIG. 3, in positioning the circle 11 with respect to the planned route 2 of the aerodyne 1 at the moment at which the latter will be in the path of the circle 11, for example at the intersection with the trajectory of the point O.

In this configuration, the computer 4 determines a safety circle 12, concentric with the circle 11, by adding a safety margin, for example of 5 nautical miles, which depends on the size and/or on the danger level of the zone 10, this circle 12 constituting a boundary which is not to be crossed by the aerodyne 1. Then, it next determines the points of exit A1, B1, and of return A3, B3 to the initially planned route 2, by computing the segments A1-A2, A2-A3, B1-B2, B2-B3 which are tangent to the safety circle 12 and make an angle α with the initial trajectory of 30 degrees or 45 degrees (depending on the air regulations in force in that region), and making it possible to bypass the zone 10 on either side of the circle 12.

These segments A1-A2, A2-A3 and B1-B2, B2-B3 respectively determine a starboard avoidance trajectory A1-A2-A3 and a port avoidance trajectory B1-B2-B3 in relation to the zone 10, which connect the points of exit A1, B1 and of return A3, B3 to the initially planned trajectory 2.

The avoidance routes are obtained by adding the portions B11A1, B3-A3 of the planned route 2 to the avoidance trajectories in such a way that the two avoidance routes B1-A1-A2-A3, B1-B2-B3-A3 have the same ends B1, A3.

It is next necessary to choose one of the two avoidance routes B1-A1-A2-A3 to B1-B2-B3-A3 thus computed. To do this, the computer 4 determines the length of each of the two new routes respectively comprising the two computed avoidance trajectories so as to select the shorter, and if these two new routes are of equal length, that which lies windward of the phenomenon is chosen.

Figure 4:
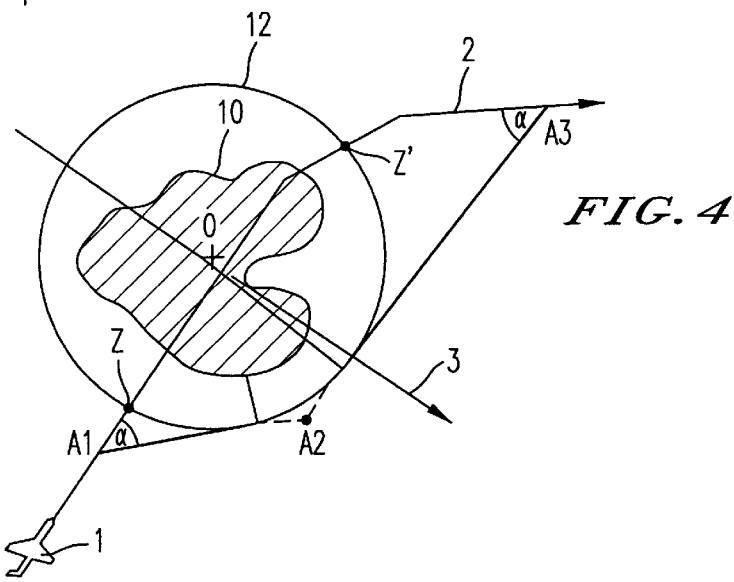

Thus, as illustrated in FIG. 4, the avoidance route chosen is that which passes through the points A1, A2 and A3.

This new route makes it possible to modify the initial flight plan which can be displayed on the screen 7, with a request for confirmation by the pilot. Thus, the points A1, A2 and A3 are inserted into the new flight plan, in the guise of points of change of heading, the portion of the initial route situated between the points A1 and A3 being deleted.

In step 25, the computer 4 waits for the confirmation by the pilot of the new flight plan including the avoidance trajectory A1-A2-A3 thus computed, doing so until the point of exit A1 from the initially planned route 2 has been, passed (step 26). While waiting, the computer 4 computes and displays the value of the distance of this point of exit A1, having regard to the current position of the aerodyne 1, this value being periodically refreshed (step 27).

If during this wait the pilot has confirmed the new flight plan, the latter is sent to the automatic piloting device 14 in replacement for that 2 initially planned, which then becomes active (step 28).

Advantageously, the transition from the segment A1-A2 to the segment A2-A3 is a simple transition, that is to say along an arc of a circle dependent on the speed of the aerodyne, which makes it possible to bypass the mobile zone 10 while following its contours as tightly as possible.

If the pilot has not confirmed the new flight plan before crossing the point of exit A1, in step 29 the computer 4 sends a message to the pilot to indicate that this point of exit has been passed. Next, in step 30, it computes the distance between the current position of the aerodyne 1 and the entry point Z of the zone delimited by the circle 12. So long as the aerodyne 1 has not reached the point Z, this distance is displayed with periodic refreshing (step 31). After this point Z has been crossed, the computer 4 sends an alert message which signals to the pilot that he is in a danger zone (step 32). The computer 4 then waits for the danger zone to be exited, having regard to the position of the point of exit Z' from this zone, and also to the current position and to the speed of the aerodyne 1 (step 33), before returning to step 18 for acquiring data from the weather radar 9.

Advantageously, the computation of the avoidance trajectory takes account of the presence of another or of other danger zones isolated by the radar.

Figure 5:
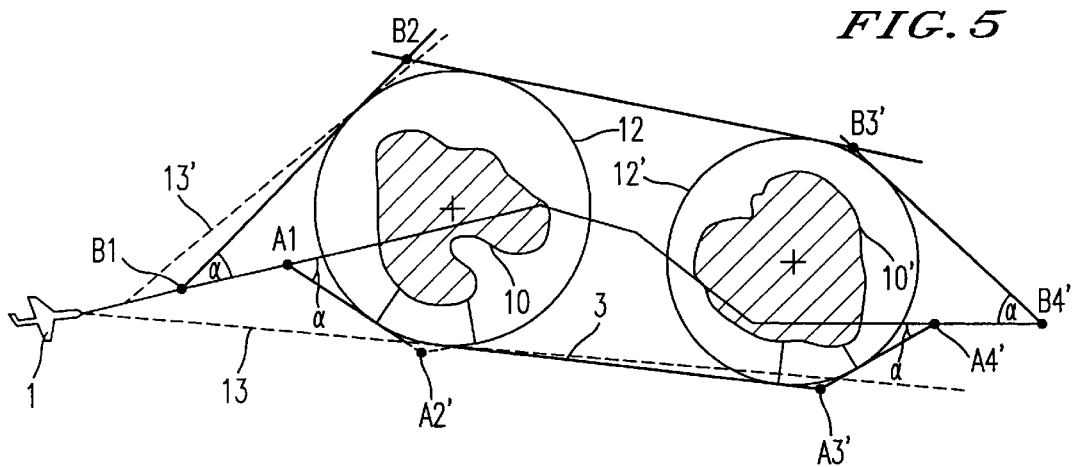
FIG. 5 illustrates the case in which two successive zones to be avoided lie on the trajectory of an aerodyne.

In the case in which two zones 10, 10' are detected, the computer 4 determines the two safety circles 12 and 12' respectively surrounding the two zones 10, 10' (FIG. 5).

Two cases arise depending on whether the second zone 10' (the one further from the aerodyne 1) is or is not situated together with the first zone 10 in a sector delimited by the two tangents 13, 13' to the safety circle 12 of the first zone 10 passing through the current position of the aerodyne 1.

If the centre of the second zone 10' is outside this sector then this zone is not to be taken into account. In the contrary case, it is appropriate to consider whether the second zone 10' is or is not very far from the first 10, for example a distance away corresponding to 5 times the radius of the circle 12 surrounding the first zone 10.

If the second zone 10' is very far from the first 10, then two successive avoidances will be carried out, considering each zone 10, 10' in isolation, and: commencing with the avoidance of the closer zone 10.

In the contrary case, and if the two zones 10, 10' traverse the initially planned trajectory 2 of the aerodyne 1 at the same moment, then the avoidance trajectory will be constructed as illustrated in FIG. 5 by computing, as before, the trajectory segments A1-A2, B1-B2 deviating from the initial trajectory 2, considering the first zone 10, and the segments A3'-A4' and B3'-B4' for returning to the initial trajectory 2, considering the second zone 10'.

It is next necessary to compute the trajectory segments A2-A3' and B2-B3', the points A2 and B2 being defined by the intersection of the tangents to the circle 12 from the points A1 and B1 and the tangents to the two circles 12 and 12', and the points A3' and B3' by the intersection of the tangents to the two circles 12 and 12' and the tangents to the circle 12' passing through the return points A4' and B4'.

As before, the avoidance trajectory which will ultimately be taken into account is that which leads to the shorter new route, and if the two new routes have identical length, the new route selected will be that which is situated windward of the zones to be avoided 10, 10'.

What is claimed is:

1. A method for the lateral avoidance by a vehicle of at least one mobile zone starting from an initially planned route sing periodically supplied contour information indicating positions of contours of the at least one mobile zone to be avoided and a current position and speed of the vehicle to generate at least one new route, the method comprising the steps of:

periodically defining an envelope of one of the at least one mobile zone to be avoided by using said contour information;

determining a circumscribed circle about the envelope and a velocity vector of the circumscribed circle by recording successive positions of the circumscribed circle: determining a portion of the planned route situated over a path of the circumscribed circle;

positioning the circumscribed circle at a moment at which the vehicle is positioned on said portion of the initially planned route;

when the circumscribed circle is traversed by the initially planned route of the vehicle after the circumscribed circle is positioned by the step of positioning the circumscribed circle, computing a port trajectory and a starboard trajectory for avoidance by the vehicle of a zone delimited by the circumscribed circle, wherein said port trajectory and said starboard trajectory connect points of exit from and of return to the initially planned route; and selecting one of the port trajectory and the starboard trajectory as a function of a length of the at least one new route and of a direction of movement of the at least one mobile zone, wherein a first one of the at least one new route includes the port trajectory and a second one of the at least one new route includes the starboard trajectory.

2. The method according to claim 1, wherein the points of exit from and of return to the initially planned route correspond to points of intersection with the initially planned route of tangents to the circumscribed circle about the envelope, forming a predetermined angle with the initially planned route, wherein the port and starboard trajectories comprise said tangents.

3. The method according to claim 2, further comprising the steps of:

approximating the contour of the at least one zone to be avoided by a polygonal contour and eliminating points of concavity, generating a convex polygonal contour;

determining a center of the circumscribed circle by a barycenter computation applied to the convex polygonal contour; and determining a radius of the circumscribed circle by computing a distance between said center and a point of the polygonal contour furthest from said center.

4. The method according to claim 2, wherein when a number of the at least one mobile zone is greater than one, the step of determining the circumscribed circle further comprises determining a circumscribed circle about the envelope of each one of the at least one zone to be avoided, and one of the respective velocity vector of the circumscribed circles thus determined, by recording successive positions of the circumscribed circles, and the method further comprises:

positioning each one of the at least one zone with respect to the initially planned route of the vehicle at respective moments at which the vehicle is situated on portions of the initially planned route which are traversed by the said at least one zone;

determining a first zone, of the at least one zone, lying on the initially planned route and first selecting a first group of the at least one zone to be avoided lying in a sector delimited by the tangents to the circumscribed circle about the first zone to be avoided and passing through the current position of the vehicle;

second selecting from the first group a second group of zones situated at a distance less than a predetermined threshold from one of the first zone and a zone included in the first group;

determining points of exit from the initially planned route by considering the first zone, and points of return to the initially planned route by determining a furthest zone selected by the step of second selecting; and computing port and starboard avoidance trajectories comprising tangent segments to the circumscribed circles about each zone selected by the steps of first and second selecting and tangent segments passing through the points of exit from and of return to the initially planned route.

5. The method according to claim 2, further comprising determining a radius of the circumscribed circle by applying a safety distance for said at least one mobile zone.

6. The method according to claim 2, further comprising the steps of continuously acquiring information representative of contours of zones associated with a danger level, supplied by a weather radar, and detecting the at least one mobile zone when said danger level exceeds a predetermined threshold.

7. The method according to claim 1, further comprising the steps of:

approximating the contour of the one of the at least one mobile zone by a polygonal contour and eliminating points of concavity to generate a convex polygonal contour;

determining a center of the circumscribed circle by a barycenter computation applied to the convex polygonal contour; and determining a radius of the circumscribed circle by computing a distance between said center and a point of the polygonal contour furthest from the center.

8. The method according to claim 7, wherein when a number of the at least one mobile zone is greater than one, the step of determining the circumscribed circle further comprises determining a circumscribed circle about the envelope of each one of the at least one zone to be avoided, and one of the respective velocity vector of the circumscribed circles thus determined, by recording successive positions of the circumscribed circles, and the method further comprises positioning each one of the at least one zone with respect to the initially planned route of the vehicle at respective moments at which the vehicle is situated on portions of the initially planned route which are traversed by said at least one zone;

determining a first zone, of the at least one zone, lying on the initially planned route and first selecting a first group of the at least one zone to be avoided lying in a sector delimited by the tangents to the circumscribed circle about the first zone to be avoided and passing through the current position of the vehicle;

second selecting from the first group a second group of zones situated at a distance less than a predetermined threshold from one of the first zone and a zone included in the first group;

determining points of exit from the initially planned route by considering the first zone, and points of return to the initially planned route by determining a furthest zone selected by the step of second selecting; and computing the port and starboard avoidance trajectories comprising tangent segments to the circumscribed circles about each zone selected by the steps of first and second selecting and tangent segments passing through the points of exit from and of return to the initially planned route.

9. The method according to claim 7, wherein the radius of the circumscribed circle is determined by applying a safety distance for said at least one mobile zone.

10. The method according to claim 7, further comprising the steps of continuously acquiring information representative of the contours of zones associated with a danger level, supplied by a weather radar, and detecting the at least one mobile zone when said danger level exceeds a predetermined threshold.

11. The method according to claim 1, wherein, when a number of the at least one mobile zone is greater than one, the step of periodically defining further comprises periodically defining an envelope of each one of the at least one mobile zone by using said contour information, and the step of determining the circumscribed circle further comprises determining a circumscribed circle about the envelope of each one of the at least one mobile zone, and the respective velocity vector of the circumscribed circles determined by the step of determining, by recording successive positions of the circumscribed circles, and the method further comprises:

positioning each one of the at least one mobile zone with respect to the initially planned route of the vehicle at moments at which the vehicle is situated on portions of the initially planned route which are traversed by said at least one mobile zone;

determining a first zone of the at least one mobile zone lying on the initially planned route;

first selecting a first group of the at least one mobile zone lying in a sector delimited by tangents to the circumscribed circle about the first zone and passing through the current position of the vehicle;

second selecting from the first group a second group of zones wherein each one of the zones included in the second group is at least one of situated at a distance less than a first predetermined threshold from the first zone and situated at a distance less than said first predetermined threshold from a zone previously selected by the step of second selecting;

determining points of exit from the initially planned route using the first zone, and determining points of return to the initially planned route by using a furthest zone selected by the step of second selecting; and computing a port trajectory and a starboard trajectory, each one of said port and starboard trajectories comprising tangent segments to the circumscribed circles about each one of the zones of the second group, and tangent segments passing through the points of exit from and of return to the initially planned route.

12. The method according to claim 11, wherein the radius of the circumscribed circle is determined by applying a safety distance for said at least one mobile zone.

13. The method according to claim 11, further comprising the step of continuously acquiring information representative of the contours of zones associated with a danger level, supplied by a weather radar, and detecting the at least one mobile zone when said danger level exceeds a second predetermined threshold.

14. The method according to claim 1, further comprising the step of determining a radius of the circumscribed circle about each one of the at least one mobile zone by applying a safety distance for said each one of the at least one mobile zone.

15. The method according to claim 14, further comprising the step of continuously acquiring information representative of the contours of zones associated with a danger level, supplied by a weather radar, and detecting the at least one mobile zone when said danger level exceeds a predetermined threshold.

16. The method according to claim 1, further comprising the steps of continuously acquiring information indicating contours of zones associated with a danger level, supplied by a weather radar, and detecting the at least one mobile zone to be avoided when the danger level exceeds a predetermined threshold value.

17. The method according to claim 1, further comprising the step of determining the at least one new route from a result of the step of selecting and from the initially planned route, wherein the at least one new route is executable by an automatic piloting device.

18. The method according to claim 1, further comprising the steps of:

periodically computing and displaying a distance between the current position of the vehicle and the point of exit from the initially planned route to the selected one of the port and starboard trajectories; and activating the at least one new route including the selected one of the port and starboard trajectories when the new route is confirmed.

19. The method according to claim 18, further comprising the steps of:

periodically computing and displaying the distance between the current position of the vehicle and the at least one mobile zone, if the point of exit is passed without confirmation of the at least one new route; and displaying an alert message when the vehicle enters the at least one mobile zone.

20. The method according to claim 1, wherein the step of selecting comprises computing a first length of a first new route and a second length of a second new route respectively of said at least one new route, the first new route including the port trajectory and the second new route including the starboard trajectory, each one of said first and second new routes including portions of the initially planned route such that the first and second new routes have the same ends, comparing the first and second lengths, and when the first and second lengths have different values, selecting one of the port trajectory and the starboard trajectory which is included in a shorter one of the first and second new routes, and when the first and second lengths equal, selecting one of the port trajectory and starboard trajectory which lies windward of the at least one zone to be avoided.

* * * * *